United States Patent [19]

Ham

[11] 4,334,199

[45] Jun. 8, 1982

[54] EXCIMER LASER

[75] Inventor: David O. Ham, Rochester, N.Y.

[73] Assignee: The University of Rochester, Rochester, N.Y.

[21] Appl. No.: 955,292

[22] Filed: Oct. 27, 1978

[51] Int. Cl.³ .......................... H01S 3/22; H01S 3/223
[52] U.S. Cl. ........................................ 372/57; 372/81
[58] Field of Search ..................... 331/94.5 G, 94.5 PE

[56] References Cited

PUBLICATIONS

Ewing et al., "Laser Action on the XeF²Σ→²Σ Band at 3540A", *IEEE J. of Quantum Electronics*, vol. QE 11, No. 7, Jul. 1975, pp. 92D-93D.

Powell et al., "Laser Oscillation on the Green Bands of XeO and KrO", *APL*, vol. 25, No. 12, Dec. 15, 1974, pp. 730-732.

Fontaine et al., "Possibility of Utilization of Three-Body Recombination Processes in Generation of High--Power Continuous-Wave Visible Laser Radiation", *Sov. J. Quant. Electron.*, vol. 6, No. 4, Apr. 1976, pp. 486-490.

*Primary Examiner*—James W. Davie
*Attorney, Agent, or Firm*—Martin LuKacher

[57] ABSTRACT

A gas laser is described which has as laser medium, a polyatomic excimer. Such a excimer is formed in a termolecular reaction between atomic particles which are raised to a metastable state by a pulse of electrical energy and a molecule which forms a complex with the excited metastable particle when a third particle or body interacts therewith to promote the termolecular reaction. After formation in the excited state and subsequent emission of coherent radiation, the particles and molecules return to the initial species.

18 Claims, 3 Drawing Figures

$\Delta E = I.P. - E.A. - D_i = E^* - D_0$

EXCIMER LASER

The present invention relates to excimer lasers and particularly to lasers where the laser medium is a polyatomic excimer.

The invention is suitable for use in gas lasers where a gas mixture is electrically excited to form a laser medium which can produce or amplify coherent radiation. It is a feature of the invention to provide a new laser medium containing a polyatomic excimer which has advantages over excimer laser mediums which have heretofore been proposed.

Excimers are molecules formed from two species of atoms or molecules when one of them is raised to an electronically excited state so that it can combine with the other species to form an excited molecule. This molecule emits radiation when it returns to the ground state which is not a bound molecule. Inasmuch as the excimer does not exist in the ground state, the mechanism assures a population inversion. Known excimer laser mediums are dimers, that is molecules made up of two atoms. Such excimer laser mediums may be classified into the following groups:

(a) Rare gas dimers, $Xe_2^*$, $Kr_2^*$ and $Ar_2^*$;
(b) Excimers which are formed from ground state rare gas atoms combined with atomic oxygen excited to metastable levels, such as O ('S), namely $XeO^*$ and $KrO^*$ excimers (see Powell, Murray & Rhodes, *Appl. Phys. Lett.*, Vol. 25, No. 12, 730, 15 Dec. 1974 and Vasov et al, *Sov. J. Quant. Electron.*, Vol. 6, No. 4, 505, April 1976);
(c) Metal-oxygen excimer laser mediums, $NaO^*$; and
(d) Rare gas monohalides, such as $XeF^*$ (see Brau & Ewing, *Appl. Phys. Lett.*, Vol. 27, No. 8, 435, 15 Oct. 1975).

All of these excimer laser mediums are dimers containing two atoms per molecule. The laser mediums provided by the present invention are polyatomic excimers which contain three or more atoms and particularly are formed by an excited atom and a molecule in a termolecular reaction with minimal competition from bimolecular reactions.

A termolecular reaction involves the simultaneous collision of three reactants. The reaction is promoted by the presence of a chemically inert third body or particle which removes energy from a colliding pair of bodies or particles of different species to produce the excimer molecule. For further information respecting termolecular reactions reference may be had to the text, *Gas Kinetics* by G. L. Pratt, Published by John Wiley & Sons (1969). These reactions are discussed on pages 3 and 4 and 93 through 100 of the text or *Foundations of Chemical Kinetics* by Sidney W. Benson, McGraw-Hill (1960), Chapter 12, Section 15, pages 305–308.

It is a feature of the invention to provide polyatomic excimer laser mediums consisting of rare gas atoms and molecules which have bonding interactions, but which do not react in bi-molecular reactions to form polyatomic molecules when these rare gas atoms are excited to metastable states. The rare gas which is most preferred is xenon (Xe) because of its relatively low ionization potential. Other rare gases which are preferred are argon (Ar) and krypton (Kr). The molecules which are preferred to form the polyatomic excimers with excited state rare gas atoms are oxygen, ($O_2$), sulphur dioxide ($SO_2$), carbon dioxide ($CO_2$), ammonia ($NH_3$), nitric oxide (NO), and nitrogen dioxide ($NO_2$). The third particles or bodies which promote the termolecular reaction are inert or noble gas atoms, preferably helium (He).

The gas mixture is contained under pressure in a chamber or envelope which may be located in a laser cavity. The envelope may be disposed also in a laser amplifier system where coherent radiation of the wave length which is emitted by the polyatomic excimer laser medium is to be amplified. The rare gas and molecule with which the polyatomic excimer is formed are present in much smaller proportion in the gas mixture than is the noble gas. The noble gas may be used to pressurize the mixture in the envelope. Pressures above atmospheric pressure, and particularly between $1\frac{1}{2}$ and 2 atmospheres are presently preferred. The laser apparatus may be pumped or excited by electrical energy. Electrical energy is preferably applied to electrodes adjacent to the gas mixture, as for example by being disposed inside the envelope which contains the gas mixture. High voltage pulses are applied to the electrodes and cause electrical pulse discharges to excite the rare gas atoms to their metastable state. The discharge ionizes the molecules of the species which forms the excimer with the rare gas as well as the noble gas. The particles are made active kinetically to produce collisions which effect the termolecular reaction in the gas mixture.

After formation of the polyatomic excimer and subsequent emission of the coherent radiation, the molecules return to their original species. Accordingly there will be few reaction products which might deteriorate the gas mixture, reducing its lifetime or requiring circulation or flow of clean gas mixture through the laser chamber. This is an important advantage over rare gas monohalide gas lasers which utilize fluorine, chlorine, bromide, or iodine. These halides are highly reactive and difficult to handle with safety. The molecular gases which produce the polyatomic excimers are safer, easier to handle and available at lower cost than the halides. Inasmuch as the polyatomic excimers formed by termolecular reactions result in fewer reaction products, there are fewer absorbing species to limit scaling to high powers than exist in the rare gas monohalide lasers. An additional advantage is the number of new available wave lengths which may be obtained by changing the molecular gas species which reacts with the rare gas to form the polyatomic excimer. It is believed that the polyatomic excimer lasers provided by the invention have the advantage of achieving high power scaleable laser action particularly in the ultra-violet (u.v.) and the near u.v. portion of the spectrum. In such event the polyatomic excimer laser may be suitable for applications such as laser fusion and laser isotope separation.

Other features, objects and advantages of the invention will become more apparent from a reading of the following description which sets forth in greater detail the preferred embodiment and best mode not known of practicing the invention. This description makes reference to the accompanying drawings in which.

Figure 1:
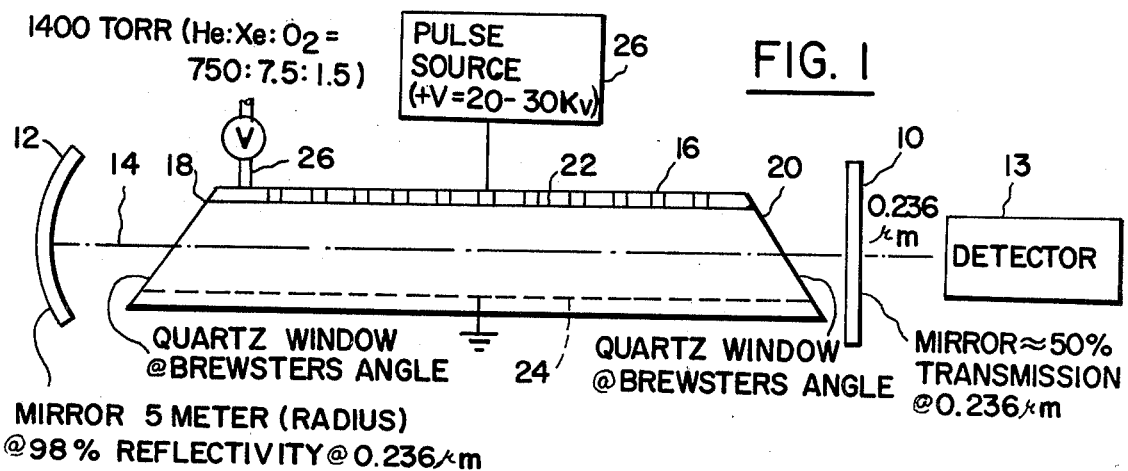
FIG. 1 is a schematic diagram of a laser which incorporates the invention.

Referring first to FIG. 1, there is shown laser apparatus which embodies the invention. The resonant cavity of the laser is defined between two mirrors 10 and 12. The mirror 10 is a flat mirror which is partially reflective and in particular is 50% reflective (viz., has 50% transmission) at the wave length of the coherent radiation produced by the laser. This wave length for a XeO$_2$* polyatomic excimer laser medium has been found to be 0.23 μm or 236 nanometers (nm). The other mirror 12 is slightly curved and may have a radius of 5 meters. The mirror 12 is approximately totally reflective (has small transmission) at a wave length of the coherent radiation (which in this example is 0.236 μm).

Figure 3:
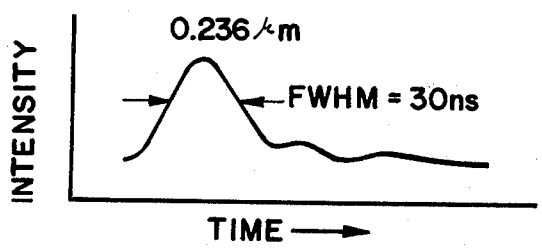
FIG. 3 is a curve showing the temporal shape of a laser pulse which has been produced with laser apparatus shown in FIG. 1.

The optical path or axis 14 of the laser extends between the mirrors through the cavity and out through the partially reflecting mirror 10 where a detector 13 may be located in order to measure the energy of the radiation emitted from the laser. This detector 13 may suitably be a pyroelectric detector such as manufacture by Gen-Tec of Ste-Foy, PQ Canada GIP 359, their model no. ED-200. In order to detect the wave length of the coherent radiation, a monochrometer may be used. A suitable monochrometer may be manufactured by Jarrel-Ash, Div. of Fisher Scientific Co., Waltham. Mass. 02154, their model 82-410, which is a ¼ meter monochrometer with 150 μm entrance and exit slits and a grating blazed at 3000 Å. The optical path 14 extends between the mirrors 10 and 12 and through the partially reflecting mirror 10 to the detector in order to detect the temporal shape of the laser pulse. The detector 13 may be a PIN-diode detector such as uses an HP-2-4220 diode detector. The output of the detector 13 may be displayed on an oscilloscope after amplification. The temporal wave form or shape of the pulse is illustrated in FIG. 3. At full width half maximum (FWHM) the pulse width is about 30 ns as seen through the monochrometer with its wavelength set at the peak wavelength of the radiation (0.236 μm). The band width of the pulse at full width half maximum (FWHM) as measured with the monochrometer is about 0.0054 μm. This band width is determined by the monochrometer, not the laser emission. The laser medium is contained in a chamber or envelope located in the laser cavity. This chamber is a tube which may be of square cross-section and approximately 10 cm on each side. The ends of the tube 16 are fused quartz windows 18 and 20. These windows are disposed at Brewster's angle with respect to the optical path 14. The tube has an electrical discharge structure consisting of a high potential electrode 22 and a grounded electrode 24. These electrodes may be disposed within the tube as shown. A source 26 of pulses at high voltage with respect to ground, suitable 20 to 30 Kv is connected across the electrodes 22 and 24. The pulse source 26 may be a conventional pulser which produces a short pulse of the order of microseconds in duration.

An inlet and outlet tube 26 with a valve therein is used to introduce and exhaust a gas mixture from the tube 16. A suitable gas mixture for producing the XeO$_2$* polyatomic excimer laser medium consists of the gases He, Xe and O$_2$ in proportion He:Xe:O$_2$ of 750:7.5:1.5 at a total pressure of about 1400 Torr or approximately 2 atmospheres. The tube 16 is evacuated and then the gas mixture is introduced. This mixture may be prepared by mixing approximately 30 Torr O$_2$, approximately 150 Torr Xe and 300 PSI He.

The mirrors 10 and 12, the discharge tube 20 and the pulse source which may be used in the exemplary laser apparatus described herein may be component parts of the Tac II model 150 XR laser manufactured by Tachisto of 13 Highland Circle, Needham Hgts., Mass. This laser is designed for use with rare gas monohalide excimers. This apparatus is designed for laser action and has as its principal advantage, being readily available apparatus for demonstrating and practicing the invention. Other apparatus and other modes of excitation than an electrical pulse discharge, for example electron beam excitation, may be used. The mirrors 10 and 12 and the windows 18 and 20 may also be varied in their design and transmission characteristics for optimum transmission of the wavelength of coherent radiation emitted by the polyatomic excimer which is used. Optimization of the gas mixture and transmission of the output coupling mirror will maximize the output power or energy.

In operation pulses are applied from the source 26 at a rate of approximately 1 Hz, after the tube 16 has been filled with the mixture. A XeO$_2$* laser medium is produced, each pulse cycle by the termolecular reaction. The coherent radiation is emitted at 0.236 μm, which is substantially the same wavelength as is predicted from the energetics of the XeO$_2$* polyatomic excimer; the predicted wavelength being 0.238 μm.

As will be explained below, the termolecular reaction to form the XeO$_2$* polyatomic excimer laser medium is the only reaction among the predominant species which is energetically possible based on kinetic considerations. The existence of this laser medium is also dictated by reason of the wave length of the coherent radiation which is detected. Accordingly, the existence of polyatomic excimer laser mediums is verified both experimentally and theoretically.

Polyatomic excimers of Xe* are preferred since the lower ionization potential (I.P.) of Xe* leads to longer wave lengths than the other polyatomic excimers which are produced from Kr* and Ar*. These particles or bodies may be considered generically as the excited state atoms R*. The molecules with which they form the polyatomic excimers may be considered generically by the symbol M. The excimer produced is thus symbolized RM*. The * above the symbol for the particle represents that it is in an excited state, i.e., a metastable state, in accordance with the convention which has been adopted in quantum electronics. The entire class of polyatomic excimers RM* are within the ambit of this invention. In the case of polyatomic excimers formed with rare gases in their excited or metastable state, such as Xe* Kr* and Ar*, the polyatomic excimers with Xe* are preferred because of their longer wavelengths in the near u.v. region of the spectrum, while Kr* and Ar* emit mostly in the vacuum u.v. The near u.v. wavelengths are preferred for applications of greatest interest such as laser fusion and isotope separation and may be implemented with optical components, such as mirrors and windows of the chamber containing the gas mixtures which are available at lower cost than optical components capable of handling wavelengths in the vacuum u.v. portion of the spectrum.

The polyatomic excimer laser mediums with the oxygen molecule O$_2$ as the M portion of the complex is preferred for excimers with Xe*, since O$_2$ has an absorption spectrum with bands removed from the wave length where Xe emits. In addition, any ozone (O$_3$) which may be formed in the discharge also has absorption bands at wave lengths which are removed from the wave length of emission from the XeO$_2$* excimer.

It will be appreciated that other excimers as may be produced from different combinations of R* atoms and M molecules may be selected in accordance with the emission wavelengths desired and the absorption bands of the reactants. The M molecules may be selected from the molecules mentioned above, namely $O_2$, $SO_2$, $CO_2$, $NH_3$, NO and $NO_2$, where the R* atomic particle is a rare gas selected from Xe*, Ar* or Kr*. The wave length of the emission from the polyatomic excimer which is formed is determined from the energetics of the system (the energy difference between the metastable and ground state of the excimer). The effective gain of the laser depends upon the absorption spectrum of the excited gas mixture and any reaction products which are produced upon excitation and reaction. The absorption spectra (viz. the bands where optical absorption occurs) of various molecules including the molecules $O_2$, $O_3$, $SO_2$, $NH_3$, NO and $NO_2$ are reported in the literature (see the text entitled, *The Identification of Molecular Spectra* by R. W. B. Pearse and A. G. Gaydon, published by Chapman and Hall, Ltd. London (1963)).

Inasmuch as the gases return to their original species after each cycle of excitation, emission and return to ground state, reactive components in the laser chamber, such as the chamber 16 (FIG. 1), are substantially eliminated. The existence of such active reactants is a serious problem in rare gas monofluoride excimer lasers and requires the frequent recharge or the flow through of the gas mixtures through the chambers. It has been experimentally demonstrated that the pulse energy decreases only 17% with 10,000 shots using a static gas and that performance is not degraded by leaving the gas mix in the laser device for many hours. These characteristics are both much superior to those of rare gas halide excimer lasers. This is attributable to the reformation of these essentially non-reactive species after each cycle. The system is also insensitive to voltage variations and the driving pulses may vary from 20 to 30 Kv without affecting the intensity of the emitted laser pulses.

Figure 2:
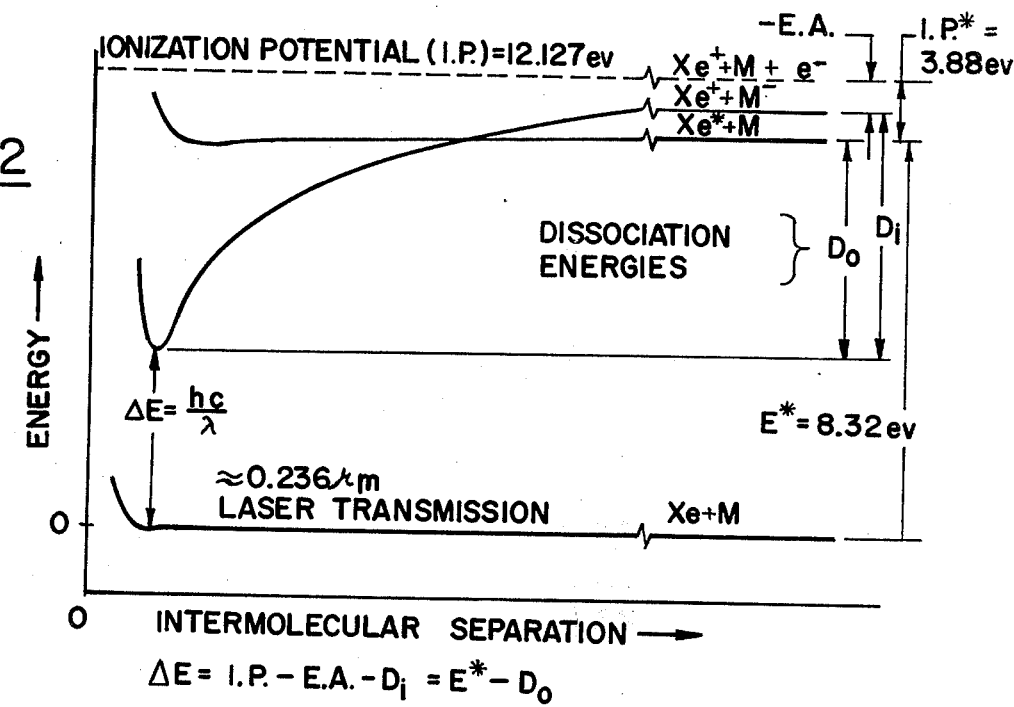
FIG. 2 is a schematic diagram of potential energy curves for rare gas polyatomic excimers, such as $XeO_2^*$.

Consider now more specifically, the energetics of polyatomic excimers and particularly excimers formed with rare gas metastables. Reference will be made to FIG. 2 which is a potential energy diagram for Xe* and M. As mentioned above, M denotes a molecule which reacts with Xe*. In the diagram, internuclear separation is roughly the distance of the Xe nucleus to the center of the negative charge on the molecule. Due to the polyatomic nature of the excimer, the internuclear separation is not precisely defined for each polyatomic excimer complex.

The energetics of the class of polyatomic excimers provided by the invention may be considered from the analogy between metastable rare gas atoms with ground state alkali atoms (see Ewing & Brau, *Physical Review* A, Vol. 12, No. 1, 129, July 1975). The properties of molecular complexes with alkali metal atoms were studied by Ham & Kinsey (see *Journal of Chemical Physics*, Vol. 53, No. 1, 285, 1 July 1970). The analogy of metastable rare gas atoms with ground state alkali atoms was made by Ewing & Brau in the context of rare gas monohalide excimers. It was discovered, in accordance with this invention, that complexes of molecules other than the halides with metastable rare gas atoms would result in polyatomic excimers having energetics which produce laser emission. It was also discovered in accordance with this invention that such polyatomic excimers especially of the metastable rare gas atoms and other molecules such as oxygen, oxygen compounds and ammonia, could be produced in termolecular reactions.

The analogy between metastable rare gas atoms and alkali atoms is shown in Table I below.

TABLE I

| metastable rare gas atom | analogous alkali atom | I.P. alkali (ev) | I.P.* metastable rare gas atom (ev) | I.P. ground state rare gas atom (ev) |
| --- | --- | --- | --- | --- |
| Ne | Na | 5.138 | | |
| Ar | K | 4.339 | 4.14 | 15.755 |
| Kr | Rb | 4.176 | 3.97 | 13.996 |
| Xe | Cs | 3.893 | 3.82 | 12.127 |

Also to be considered in connection with the energetics of polyatomic excimers are the electron affinities of the molecules which form these excimers. These electron affinities are as follows (the values given in the listing are in electron volts): $SO_2$, 1.14±0.15; $CO_2$, 0; $O_2$, 0.44±0.008; NO, 0.19; and $NO_2$, 4.0.

Using these properties and the analogy, the energy difference, $\Delta E$, between the $XeO_2^*$ polyatomic excimer and $XeO_2$ may be determined, and from this energy difference, $\Delta E$, the excimer fluorescence wavelength may be determined from the relationship $\Delta E = hc/\lambda$, as shown in FIG. 2. It will be recalled in FIG. 2 that M represents the molecule of the excimer, e.g. $O_2$.

Consider first the alkali complex $NaO_2$. The analog of $NaO_2$ is $NeO_2$ This molecule is not of immediate interest due to the high I.P. of Ne*, therefore the properties of $CsO_2$ will be estimated from comparisons from $NaO_2$ and the properties of the analog $XeO_2^*$ will be determined. The dissociation energy of $NaO_2$, $D_o$ (Na-$O_2$) is 65±3 kcal/mole or 2.80±0.13 e.v. (see McEwan and Phillips, *Trans. Faraday Soc.* 62, 1717 (1966)).

The dissociation energy of the $XeO_2^*$ molecule may be determined by two methods. First, from the dissociation energy of certain sodium and cesium molecules, NaCl vs. CsCl; NaBr vs. CsBr and NaI vs. CsI, as reported by Gaydon in the text (A. G. Gayden, *Dissociation Energies*, 3rd Ed., Chapman and Hall), it can be seen that the dissociation energy difference in units of kcal/mole differ, in each case by less than 10. This difference is believed to be due primarily to the different ionic properties of Cs and Na and should be similar in the $NaO_2$ and $CsO_2$ molecules. Adding the average difference of 7 kcal/mole to the dissociation energy of $NaO_2$ gives the dissociation energy of $CsO_2$ of 72 kcal/mole or 3.1 e.v. Therefore, by analogy, the dissociation energy of $XeO_2^*$, $D_o$ ($XeO_2^*$) is 3.1 e.v.

The same result may be obtained from the dissociation energies of alkali metal complexes into their ions. These dissociation energies are also shown in FIG. 2. It is known that the dissociation energy, $D_i$ ($NaO_2 \rightarrow Na^+ + O_2^-$) is 173 kcal/mole. From FIG. 1 of the above reference article by Ham & Kinsey the dissociation energy of $CsO_2$ into its ions is seen to be 20 kcal/mole per mole less than dissociation energy of $NaO_2$ into its ions. In other words $D_i$ ($CsO_2 \rightarrow Cs^+ + O_2^-$) $-D_i$ ($NaO_2 \rightarrow Na^+ + O_2^-$) is 20 kcal/mole. $D_i$ ($CsO_2 \rightarrow Cs^+ + O_2^-$) is therefore 153 kcal/mole or 6.66 e.v. By analogy $D_i$ ($XeO_2^* \rightarrow Xe^+ + O_2^-$) is also 6.66 e.v. The dissociation energy of $XeO_2$ is determined from FIG. 2, $D_o = D_i - I.P.^* + E.A.$ Using values for I.P. given in Table I and of E.A. in the listing of electron affinities given above, it is seen that $D_o$ ($XeO_2^*$) is approximately 6.66 − 3.82 + 0.44 or 3.08 e.v., i.e. approximately the same as obtained directly from the dissociation energies.

From FIG. 2 it is seen that $\Delta E = E^* - D_o$ for $XeO_2^*$. This energy difference is 5.2 e.v. or 42,000 cm$-1$. From the equation for wavelength, ($XeO_2^*$) is 0.238 $\mu$m which is almost the same as obtained experimentally using the apparatus described above in connection with FIG. 1.

The same relationships apply to other polyatomic excimers. Using this relationship, $D_o = D_i - I.P.^* + E.A.$, and the values for ionization potential in Table I and the ionic dissociation energy $D_i$ of 6.66 e.v. for $Xe^*$, the wavelengths for $XeSO_2^*$, $XeCO_2^*$ and $XeNO^*$, for example are 0.287 $\mu$m, 0.227 $\mu$m and 0.272 $\mu$m, respectively. The wavelengths for other polyatomic excimers $RM^*$ may be determined by similar energetic considerations where R is a rare gas metastable analgous to an alkali metal in the ground state.

Consider now the kinetics of the gas mixture which is used in the example given in connection with FIG. 1 namely $He:Xe: O_2$.

$$Xe^* + O_2 + He \rightarrow XeO_2^* + He \quad (1)$$

The He stabilizes the complexes, similar to those studied by Ham and Kinsey which otherwise would just fly apart.

$$Xe^* + O_2 \rightleftharpoons XeO^* \quad (2)$$

The bimolecular reaction $$Xe^* + O_2 \rightarrow XeO^* + O \quad (3)$$

is energetically impossible.

Some small amount of oxygen in the forms $O(^3P)$, O ($^1D$) or O ($^1S$) can be formed by the discharge in the laser chamber and can lead to the following types of reactions:

$$Xe^* + O + He \rightarrow XeO^* + M \quad (4)$$

$$Xe^* + Xe + He \rightarrow Xe_2^* + He \quad (5a)$$

$$Xe_2 + O \rightarrow XeO^* + Xe \quad (5b)$$

Excited (electronically) oxygen molecules can react $$Xe^* + \begin{matrix} O_2(^1\Delta g) \\ O_2(^1\Sigma g) \end{matrix} \longrightarrow XeO^* + O \quad (6)$$

None of these reactions (4)–(6) have serious effects on the $XeO_2^*$ production because the densities [O] and [$O_2^*$] are very small. A small steady state concentration of ozone, $O_3$, may be formed via $$O + O_2 + He \rightarrow O_3 + He \quad (7)$$

which will react via $$Xe^* + O_3 \rightarrow XeO^* + O_2 \quad (8)$$

or $$O + O_3 \rightarrow 2O_2 \quad (9)$$

From the foregoing descriptions, it will be apparent that there has been provided improved laser apparatus and particularly improved gas lasers. The advantages of the invention are obtained from a new class of laser mediums provided by polyatomic excimers. While various excimers and laser apparatus have been described in order to make the invention known to those skilled in the art, it will be appreciated that variations and modifications in the herein described laser apparatus and laser mediums will become apparent to those skilled in the art. Accordingly, the foregoing description should be taken as illustrative and not in any limiting sense.

What is claimed is:

1. In a gas laser, apparatus comprising a chamber containing a mixture of at least three molecular species which produce a polyatomic excimer laser medium in a termolecular reaction when excited to raise at least one of said species to a metastable state, and means coupled to said mixture for exciting said species to said metastable state.

2. The invention as set forth in claim 1 wherein said one species is a rare gas.

3. The invention as set forth in claim 2 wherein said rare gas is selected from the group consisting of Xe, Kr and Ar.

4. The invention as set forth in claim 2 wherein a second of said species is a molecule which forms a bonding interaction for complex formation with said rare gas when said rare gas is in its metastable state.

5. The invention as set forth in claim 2 wherein a second of said species is a molecule which forms a bonding interaction for complex formation with an alkali metal in its ground state.

6. The invention as set forth in claims 4 or 5 wherein said second species is selected from the group which consist of $SO_2$, $CO_2$, NO, $NO_2$, $O_2$ and $NH_3$.

7. The invention as set forth in claim 4 wherein the third of said species is a noble gas.

8. The invention as set forth in claim 7 wherein said one species is Xe, said second species is $O_2$, and said third species is He.

9. The invention as set forth in claim 7 wherein said one species, said second species and said third species are in the ratio of about 7.5:1.5:750 at a pressure of about 1400 Torr.

10. The invention as set forth in claim 2 wherein said exciting means comprises means for exciting the gas mixture by electrical energy.

11. The invention as set forth in claim 10 wherein said exciting means includes electrode means coupled to said chamber for producing electrical pulse discharges in said mixture.

12. In a laser, a chamber containing a laser medium consisting of a polyatomic complex $RM^*$ where R is a rare gas in an excited state and M is a molecular gas in a ground state, and means for coupling pulses of electrical energy to raise said rare gas to said excited state.

13. The invention as set forth in claim 12 wherein said rare gas is selected from Xe, Ar and Kr and said gas molecule is selected from $SO_2$, $CO_2$, NO, $NO_2$, $O_2$ and $NH_3$.

14. The invention as set forth in claim 13 wherein said molecular gas and rare gas are maintained under pressure above atmospheric pressure in said chamber by a noble gas which is present in said container in much larger proportion than said molecular gas and said rare gas.

15. The invention as set forth in claim 14 wherein said rare gas is Xe, said molecular gas is $O_2$ and said noble gas is He, where the proportion of $He:Xe:O_2$ is about 750:7.5:1.5 and the pressure in said container exceeds one atmosphere.

16. A laser for producing coherent radiation comprising a pair of spaced apart reflectors forming a resonant cavity for reflecting coherent radiation, an envelope disposed along an optical path between said mirrors, said envelope having end windows transparent to the coherent radiation, and means for producing in said envelope a laser medium containing a polyatomic excimer RM* where R is a rare gas in a metastable state and M consists of a molecular gas selected from $O_2NO$, $NO_2$, $NH_3CO_2$ and $SO_2$ which emits the coherent radiation in said cavity and along said optical path.

17. The invention as set forth in claim 16 wherein said producing means comprises a mixture of said rare gas R and said gas M and a noble gas which is of a different species from said rare gas, and means for applying an electrical pulse to said gas to excite said rare gas to metastable state, the termolecular reaction product of which with said gas M and said noble gas is said polyatomic excimer.

18. The invention as set forth in claim 17 wherein in said mixture, said rare gas is Xe, said gas M is $O_2$ and said noble gas is He, said Xe being in larger proportions than said $O_2$ in said mixture and said He being in much larger proportion in said mixture than Xe and $O_2$ and being at a pressure greater than one atmosphere.

* * * * *